United States Patent [19]

Takashima

[11] Patent Number: 4,701,806

[45] Date of Patent: Oct. 20, 1987

[54] ADAPTIVE PSEUDO HALFTONE GENERATOR

[75] Inventor: Yosuke Takashima, Tokyo, Japan

[73] Assignee: NEC Corporation, Tokyo, Japan

[21] Appl. No.: 703,570

[22] Filed: Feb. 20, 1985

[30] Foreign Application Priority Data

Feb. 20, 1984 [JP] Japan .................................. 59-29733

[51] Int. Cl.⁴ .............................................. H04N 1/40
[52] U.S. Cl. ................................................... 358/283
[58] Field of Search ................................ 358/283, 280

[56] References Cited

U.S. PATENT DOCUMENTS

| | | | |
|---|---|---|---|
| 4,403,257 | 9/1983 | Hsieh | 358/283 |
| 4,433,346 | 2/1984 | Stoffel | 358/283 |
| 4,549,220 | 10/1985 | Suzuki | 358/283 |
| 4,554,594 | 11/1985 | Ciardiello | 358/283 |
| 4,577,235 | 3/1986 | Kannapell | 358/283 |

*Primary Examiner*—Michael A. Masinick
*Attorney, Agent, or Firm*—Sughrue, Mion, Zinn, Macpeak, and Seas

[57] ABSTRACT

An adaptive pseudo halftone generator which achieves high resolution and faithful rendering of gray scales or gradations even when video image data comprise a mixture of alphanumeric characters and other symbols represented by two-level signals and photographs and like images represented by multi-level signals. A value indicative of a degree of continuity of tones of an input video signal is computed to control the threshold value adapted for dot pattern representation on the basis of the computed value.

13 Claims, 6 Drawing Figures

| 3  | 7  | 31 | 39 | 45 | 46 | 40 | 32 | 8  | 4  |
|----|----|----|----|----|----|----|----|----|----|
| 11 | 15 | 27 | 33 | 37 | 38 | 34 | 28 | 16 | 12 |
| 19 | 23 | 25 | 21 | 17 | 18 | 22 | 26 | 24 | 20 |
| 47 | 41 | 29 | 13 | 5  | 6  | 14 | 30 | 42 | 48 |
| 50 | 44 | 36 | 9  | 1  | 2  | 10 | 35 | 43 | 49 |
| 46 | 40 | 32 | 8  | 4  | 3  | 7  | 31 | 39 | 45 |
| 38 | 34 | 28 | 16 | 12 | 11 | 15 | 27 | 33 | 37 |
| 18 | 12 | 26 | 24 | 20 | 19 | 23 | 25 | 21 | 17 |
| 6  | 14 | 30 | 42 | 48 | 47 | 41 | 29 | 13 | 5  |
| 2  | 10 | 35 | 43 | 49 | 50 | 44 | 36 | 9  | 1  |

ADAPTIVE PSEUDO HALFTONE GENERATOR

BACKGROUND OF THE INVENTION

The present invention relates to an adaptive pseudo halftone generator for convering input video signals representative of binary images and images with continuous tones to pseudo halftones.

Pseudo representation of continuous tones may be implemented by a pattern of dots as has been extensively practiced in the graphic art. Applied to photographs and like images consisting of continuous tones, the dot pattern representation satisfactorily reproduces the gray scales or gradations without no false contours developed and, thereby, allows the resulting images to appear natural to the human eye. However, when it comes to alphanumeric characters and other line images which themselves are two-level or binary video image data, the dot pattern representation causes the lines to broaden at the center of a dot pattern and omitted at the periphery, resulting in poor resolution. The resolution may even be so poor that characters are illegible when they are small. While video image data may be digitized using a fixed threshold value in an attempt to preserve the contours of characters and other lines and, thereby, enhance the resolution, such will prevent gradations to be rendered in those parts of video image data which contain continous tones such as photographs, while allowing false contours to appear in reproduced images. Furthermore, the fixed theshold scheme is apt to give unnatural and coarse appearance to resulting images.

SUMMARY OF THE INVENTION

It is therefore an object of the present invention to provide an adaptive pseudo halftone generator which accomplishes desirable resolution and tone rendering capability at once.

It is another object of the present invention to provide an adaptive pseudo halftone generator which outputs pseudo halftone images free from unnatural appearance or coarseness.

It is another object of the present invention to provide a generally improved adaptive pseudo halftone generator.

In one aspect of the present invention, there is provided an adaptive pseudo halftone generaor for adaptively coverting to to pseudo halftone an input video signal which is representative of a binary image and an image with continuous tones. The adaptive pseudo halftone generator includes a compute circuit for computing a value indicative of a degree of continuity of tones of the input image signal. A threshold prepare circuit prepares a threshold value by controlling an amplitude of a periodically varying threshold value on the basis of the computed value output from the compute circuit. A digitizer digitizes the input video signal with respect to the threshold value output from the threshold prepare circuit to convert the input video signal to a pseudo halftone.

In another aspect of the present invention, there is provided an adaptive pseudo halftone generator for adaptively converting to a pseudo halftone an input video signal which is representative of a binary image and an image with continuous ones. The pseudo halftone generator includes a compute circuit for computing a contrast indicative of a degree of continuity of tones of the input image signal. A threshold prepare circuit prepares, on the basis of the computed contrast output from the compute circuit, a new threshold value by providing a weighted mean value of a periodically varying threshold value assigned to generation of pseudo halftones and a fixed threshold value assigned to digitization of images which are void of halftones. A digitizer digitizes the input video signal with respect to the new threshold value output from the threshold prepare circuit to convert the input video signal to a pseudo halftone.

In another aspect of the present invention, there is provided an adaptive pseudo halftone generator for adaptively converting to a pseudo halftone an input video signal which is representative of at least one of a binary image and an image with continuous tones. The pseudo halftone generator includes a compute circuit for computing a value indicative of a degree of continuity of tones of the input video signal. A threshold prepare circuit outputs a first threshold value, which is associated with the images with continuous tones, directly as a second threshold value if the computed value output from the compute circuit is smaller than a predetermined reference value and outputs as the second threshold value a threshold value provided by weighting the first threshold value and a threshold value, which is associated with the binary images, by a weighting coefficient obtained from the computed value if the computed value is not smaller than the reference value. A digitizer converts the input image to a pseudo halftone by digitizing the input image signal with respect to the second threshold value output from the threshold prepare circuit.

The above and other objects, features and advantages of the present invention will become more apparent from the following detailed description taken with the accompanying drawings.

DESCRIPTION OF THE PREFERRED EMBODIMENTS

While the adaptive pseudo halftone generator of the present invention is susceptible of numerous physical embodiments, depending upon the environment and requirements of use, substantial numbers of the herein shown and described embodiments have been made, tested and used, and all have performed in an eminently satisfactory manner.

Figure 1:
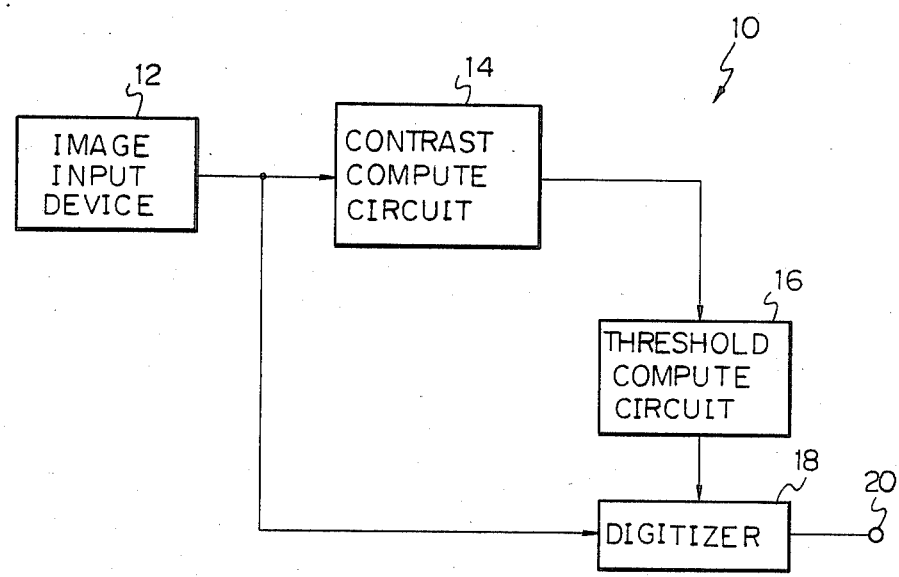
FIG. 1 is a block diagram of an adaptive pseudo halftone generator embodying the present invention.

Referring to FIG. 1 of the drawings, an adaptive pseudo halftone generator embodying the present invention is shown and generally designated by the reference numeral 10. The generator 10 in the illustrative embodiment uses contrasts as a creterion for the decision of whether or not input video image data are continuous tones. An image input device 12 includes a sensor, an analog-to-digital converter and the like (not shown) to produce digitized video image data. The digital video image data are applied to a contrast compute circuit 14 which computes a contrast of a particular pixel being observed and delivers it to a threshold prepare circuit 16. The circuit 16 functions to prepare a new threshold value by obtaining, on the basis of the calculated contrast, a weighted mean of a periodically varying threshold value adaped for pseudo halftone generation, e.g. a threshold value for dot pattern representation, and a fixed threshold adapted for digitization of binary image portions which are void of halftones. Specificlaly, if the contrast is relatively small, the circuit 16 greatly weights the periodically varying threshold value by the weighting and averaging operation because such a contrast may reasonably be regarded as representing a photograph or like image area with halftones. Conversely, if the contrast is relatively large, the circuit 16 greatly weights the fixed threshold value. The threshold value output from the circuit 16 is routed to a digitizer 18 which, based on the input threshold value, digitizes the video signal applied thereto from the image input device 12 and delivers a resulting binary level signal to an output terminal 20.

Figure 2:
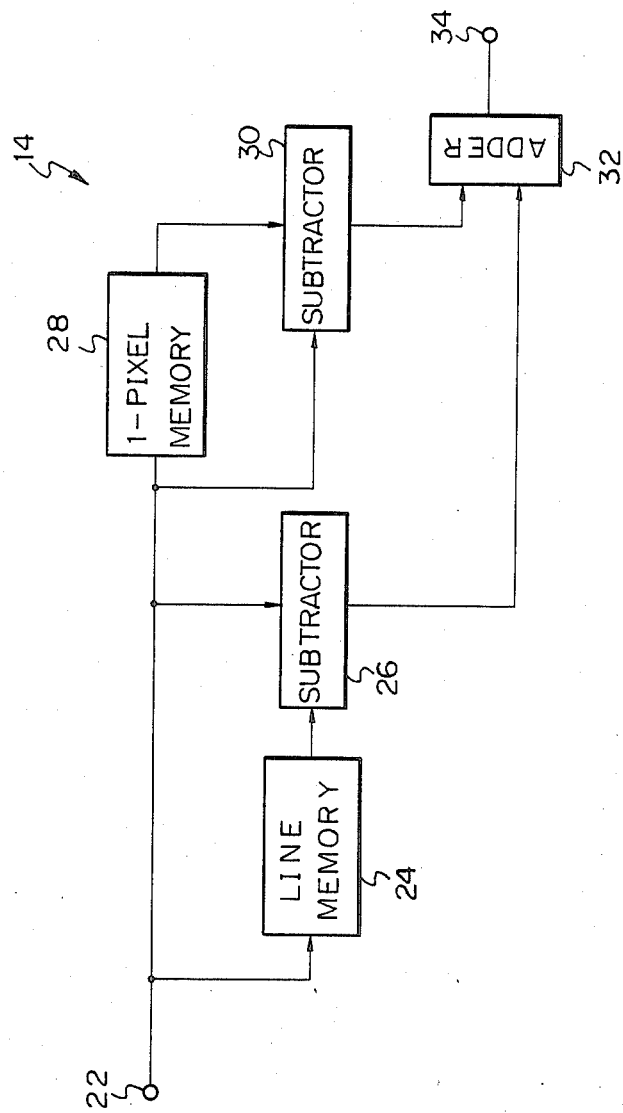
FIG. 2 is a block diagram of a contrast compute circuit shown in FIG. 1.

A specific construction of the contrast compute circuit 14 is shown in FIG. 2. A video signal coming in through a terminal 22 is delayed one line by a line memory 24 and, then, applied to a subtractor 26. The subtractor 26 produces the absolute value of a difference between pixels on the present line and those on the immediately preceding line. In addition to the contrast between nearby lines, the circuit 14 computes contrasts within the individual lines by means of a one-pixel memory 28 and a subtractor 30. The outputs of the subtractors 26 and 30 are applied to an adder 32. Therefore, an output of the adder 32 appearing at a a terminal 34 is the sum of the contrast between lines and the contrast within each line, i.e. the sum of absolute values of the differences.

In this particular embodiment, image portions with high contrasts are discriminated from the others in view of the fact that line such as alphanumeric characters, i.e. high contrast image areas, involve sharp edges. Alternatively, the discrimination of continuous tones may be accomplished by using spatial frequencies of video signals.

Figure 3:
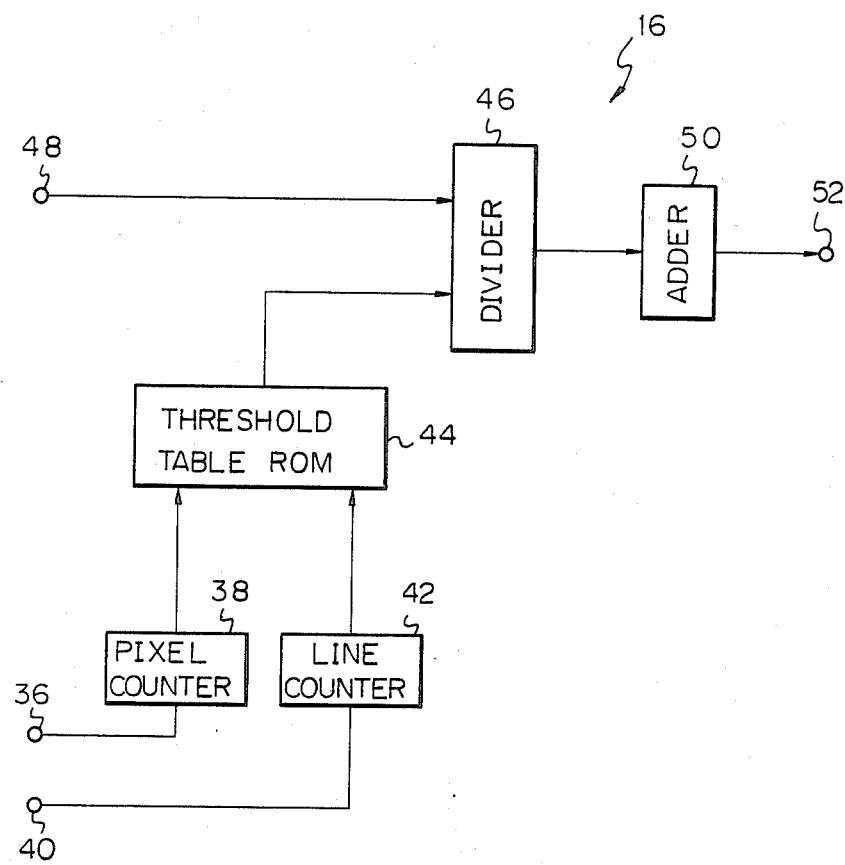
FIG. 3 is a block diagram of a first example of a threshold prepare circuit also shown in FIG. 1.
Figures 4, 5:
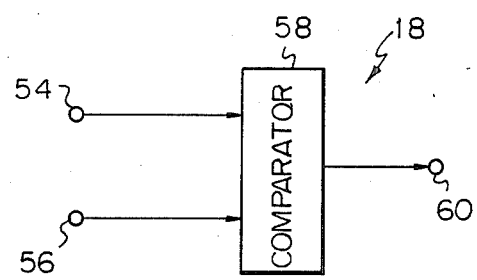
FIG. 4 shows a threshold matrix associated with dot pattern representation of gray scales.
FIG. 5 is a block diagram of a digitizer shown in FIG. 1.

Referring to FIG. 3, a specific construction of the threshold prepare circuit 16 is shown in detail. Pixel-by-pixel clock is applied from a clock generator (not shown) to a terminal 36 to drive a pixel counter 38. Applied to a terminal 40 is line-by-line clock which is generated by a clock generator (not shown) for driving a line counter 42. A threshold table ROM (read only memory) 44 is addressed by outputs of the two counters 38 and 42 to produce threshold values T for dot pattern representation such as shown in FIG. 4. However, it is not that the threshold values T are stored in the ROM 44 as they are but that values $(T-T_1)$ produced by subtracting a fixed threshold value $T_1$ adapted for digitization of line or binary images from the respective threshold values T are stored.

In FIG. 3, a divider 46 to which a contrast coming in through a terminal 48 is applied normalizes the contrast and divides an output $(T-T_1)$ of the ROM 44 by the normalized vaue N to output $(T-T_1)/N$, where N is assumed to be equal to or greater than 1. Subsequently, an adder 50 adds the fixed threshold $T_1$ to the output of the divider 46 whereby $(T-T_1/N+T_1)$ appears at a terminal 52. This is the modified theshold value for the representation of a dot pattern.

As N increases at an edge of a line, $(T-T_1)/N$ decreases and the threshold value approximates to the fixed value $T_1$ at any position of the dot pattern and, therefore, the resulting image appears as if it were digitized with respect to the fixed threshold. Conversely, in the case of a photograph or like image which usually includes few edges and bears smoothly varying gradations, N decreases and the influence of the fixed threshold $T_1$ decays so that the threshold comes to be determined by T. Since T differs from one position to another of the dot pattern as shown in FIG. 4, there will be attained an ordinary dot pattern image.

An exemplary construction of the digitizer 18 is shown in FIG. 5. In this particular example, a threshold value output from the threshold prepare circuit 16 is applied to a terminal 54, while a video signal from the image input device 12 is applied to a terminal 56. A comparator 58 compares the two signals and the result of comparison is fed out through a terminal 60.

As described above, the adaptive pseudo halftone generator in accordance with the first embodiment digitizes input video signals using an almost fixed threshold value in those image areas where the contrast is high, e.g. line images, thereby attaining high resolution. Meanwhile, it digitizes input video signals with respect to threshold values adapted for dot pattern representation in the other image areas where the gradation slowly varies, thereby preserving remarkable gradation rendering capability. In short, the resulting images are free from blurr even in alphanumeric characters and other lines and, also, free from false contours even in photographs.

While the embodiment shown and described achieves such unprecedented advantages, it may bring about some undesirable occurrence due to the particular pseudo halftone generation procedure wherein, even when the contrast is insignificant, pseudo halftone is generated using a new threshold value which is provided by weighting and averaging a periodically varying threshold value assigned to pseudo halftone generation and a threshold value assigned to digitization of binary images such as lines. The apprehended occurrence is that the configuration of a dot matrix may become susceptive even to subtle changes in the gradation of photograph areas as well as to noise, causing reproduced images to appear unnatural and coarse to the human eye.

A second embodiment of the present invention which settles the above situation will be described hereinafter.

The principles of the second embodiment are as follows. A value indicative of a degree of continuity of tones of an input video signal (e.g. contrast) provided by computation is compared with a predetermined reference value. If the computed value is smaller than the reference, implying that the continuity is small, the video signal is regarded as representing such a halftone image area as a noise area or a photograph and, so, digitized with respect to a periodically varying threshold value adapted for pseudo halftone generation (e.g. threshold value for dot pattern representation or for dithering). If the tone continuity is not small, that is, if the probability of the input video signal representing a character or like line pattern rather than halftone, a threshold value for line pattern digitization and the threshold value for pseudo halftone generation are weighted and averaged to provide a new threshold value using the bove-mentioned computed value, the input video signal being digitized with respect to the new threshold value. By digitizing an input video signal with the above principles, the threshold value is prevented from being modified unless the tone difference becomes substantial and, hence, the digitization is prevented from causing much of disturbance to the dot pattern configuration or making reproduced images coarse depite any subtle changes of gradation or noise.

Figure 6:
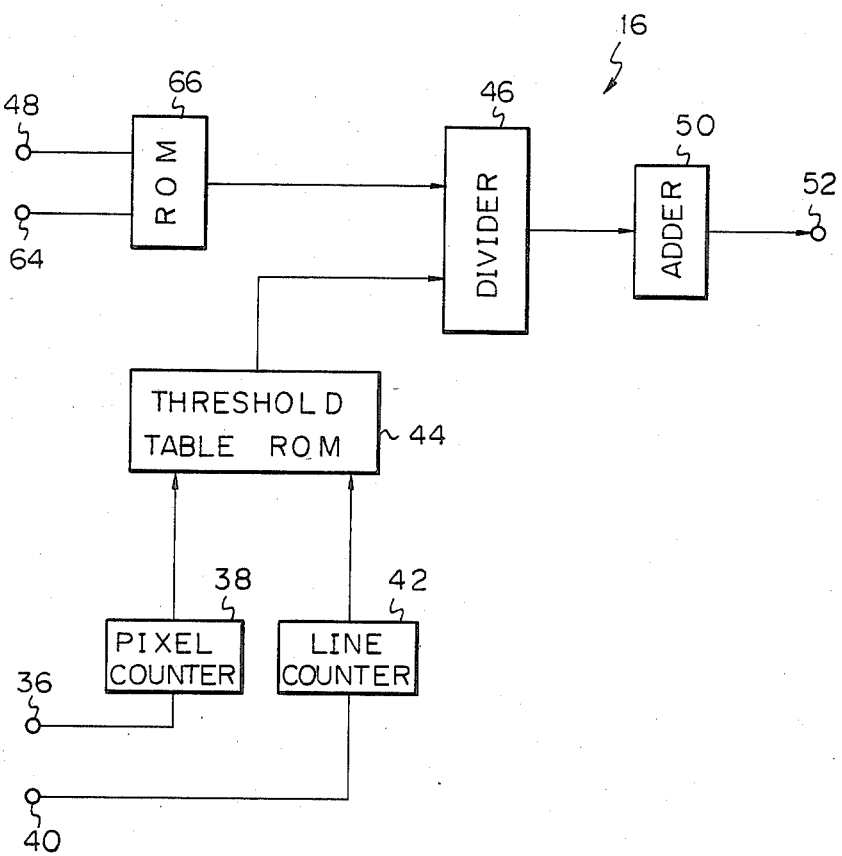
FIG. 6 is a block diagram of a second embodiment of the threshold prepare circuit.

As will now be imagined, the second embodiment which will be described is distinguished from the first embodiment by the function and construction of the threshold prepare circuit and is exactly the same as the latter concerning the other structural elements. For this reason, description will be made solely of a threshold prepare circuit 62 in accordance with the second embodiment, shown in FIG. 6. In FIG. 6, the same structural elements as those shown in FIG. 3 are designated by like reference numerals and detailed description thereof will be omitted for simplicity.

Referring to FIG. 6, the threshold prepare circuit 62 includes a ROM 66 which receives a contrast via a terminal 48 and a reference value via a terminal 64. That is, the ROM 66 compares the contrast applied to the terminal 48 with the reference value applied to the terminal 64. An optimum value of the reference depends upon the characteristics of image input and output devices such as the characteristic of a photoelectric transducer, an output image recording system, computation accuracy of the circuit 62 itself, illumination conditions, etc. Therefore, subjective evaluation tests should be conducted in order to select an optimum value which does not invite undesirable changes of the threshold value adapted for dot pattern representation, i.e. disfigurement of dot patterns and coarse appearance of images as mentioned earlier, despite subtle changes in the tone of photographs or noise. The ROM 66 is absent in the first embodiment and its function is to produce "1" when the input contrast is smaller than the reference value and a product of the contrast and a predetermined coefficient when the former is not smaller than the latter and not simply to provide a result of comparison.

As described above, the second embodiment of the present invention is constructed such that, on the basis of a result of comparison between a contrast and a reference value provided by the ROM 66, the threshold value is prevented from being varied unless the gradation of an input image exceeds a certain degree of discontinuity. Such effectively eliminates disturbance to dot patterns and coarse images otherwise originating from delicate changes of gradation and noise.

Assuming that the output of the ROM 66 is N as in the first embodiment, the divider 46 divides an output of the ROM 44, $T-T_1$, by N to provide $(T-T_1)/N$. The adder 50 then adds $T_1$ to $(T-T_1)/N$ to produce $(T-T_1)/N+T_1$. This is the adapted threshold value for providing a dot pattern. That is, $(T-T_1)$ is the amplitude of the threshold value for providing a dot pattern and it will be updated when the contrast is greater than the aforementioned reference value.

Upon increase of N at an edge of a line image, $(T-T_1)/N$ decreases to bring the threshold value closer to $T_1$ at any point of a dot patern so that the resulting image appears as if it were digitized with respect to a fixed threshold value. Conversely, where the input image includes few edges and bears a smoothly varying gradation as in a photograph or where the contrast is slightly enhanced by noise, N equals 1 and, so, the influence of $T_1$ diminishes to make T the threshold value. The value T varies as shown in FIG. 4 depending upon the position within a dot pattern, providing an ordinary dot image.

While in the second embodiment described above the threshold value is modified by a value resulting from multiplication of a contrast by a predetermined constant, even a power of a contrast or an exponential function or like function may be used for the same purpose.

As described hereinabove, the adaptive pseudo halftone generator of the second embodiment uses an almost fixed threshold for digitizing input images which represent lines and others high contrast image areas, thereby insuring high resolution. At the same time, it digitizes input images by a threshold value assigned to dot pattern representation when their gradations are changed only slowly or when their contrasts are slightly enhanced by noise, thereby preserving a desirable tone rendering capability. Again, such realizes excellent images which are free from blurr even in character areas and from false contours even in photographic areas.

Various modifications will become possible for those skilled in the art after receiving the teachings of the present disclosure without departing from the scope thereof.

What is claimed is:

1. An adaptive pseudo halftone generator for adaptively converting to a pseudo halftone an input video signal, said signal defining a plurality of sequentially occurring pixels, each having a tone value, and being representative of a binary image and an image with continuous tones, comprising:

computing means for computing a contrast value (N) indicative of a degree of continuity of tones of the input image signal by sequentially comparing the tone of an observed pixel with the tones of plural surrounding pixels;

threshold preparing means for preparing a threshold value (T) by controlling an amplitude of a periodically varying threshold value on the basis of said contrast value N, said threshold value T being variable with the contrast value N such that as N increases, T approaches a first threshold $T_1$, which is adapted for binarization of line images and as N decreases, T approaches a second threshold $T_2$ which is adapted for the binarization of images with halftones; and digitizing means for digitizing the input video signal with respect to the threshold value output from said threshold preparing means to convert the input video signal to a pseudo halftone.

2. An adaptive pseudo halftone generator for adaptively converting to a pseudo halftone an input video signal, said signal defining a plurality of sequentially occurring pixels, each having a tone value, and being representative of a binary image and an image with continuous tones, comprising:

computing means for generating a contrast output indicative of a degree of continuity of tone values of the pixels in said input image signal by sequentially comparing the tone of an observed pixel with the tones of surrounding pixels;

threshold preparing means for preparing, on the basis of the contrast output generated by said computing means, a new threshold value, said new value being provided as a weighted mean value of a periodically varying threshold value assigned to generation of pseudo halftones and a fixed threshold value assigned to digitization of images which are void of halftones; and digitizing means for digitizing the input video signal with respect to the new threshold value from said threshold preparing means to convert the input video signal to a pseudo halftone.

3. An adaptive pseudo halftone generator for adaptively converting to a pseudo halftone an input video signal, said signal defining a plurality of sequentially occurring pixels, each having a tone value, and being representative of at least one of a binary image and an image with continuous tones, comprising:

computing means for computing a contrast value indicative of a degree of continuity of tones of the input video signal by sequentially comparing the tone of a first pixel with the tones of plural surrounding pixels;

threshold preparing means for generating an output value, said output value being a first threshold value which is associated with images having continuous tones, if the computed value output from said computing means is smaller than a predetermined reference value and said output value being a second threshold value, which is provided by weighting the first threshold value and a third threshold value, which is associated with the binary images, by a weighting coefficient obtained from the computed value, if the computed value is not smaller than the reference value; and digitizing means for convertng the image to a pseudo halftone by digitizing the input image signal with respect to the output value from said threshold preparing means.

4. An adaptive pseudo halftone generator for adaptively converting an input video signal into a pseudo halftone signal having a binary signal form, comprising:

means for storing dither threshold values, said dither threshold values varying periodically in response to a sequence of said input video signal;

means for reading out the dither threshold value stored in said storing means in accordance with the sequence of said video signal;

means for detecting a degree of a level transition of said input video signal;

means for modifying said dither threshold value readout by said reading means in response to said degree detected by said detecting means for delivery of a modified dither threshold value; and means for digitizing said input signal into said pseudo halftone signal by comparing said input video signal with said modified dither threshold value.

5. A pseudo halftone generator as claimed in claim 4, further comprising means coupled between said detecting means and said modifying means for multiplying said degree value by a coefficient when said degree value is larger than a predetermined value.

6. The adaptive pseudo halftone generator as set forth in claim 4, wherein said means for modifying the dither threshold value, on the basis of the degree of level transition detected by said detecting means, modifies the dither threshold value to a first level adapted for the binarization of line images with a large level transition and to a second level approximating the dither threshold value with a small level transition.

7. The adaptive pseudo halftone generator as set forth in claim 4 wherein said storing means stores a threshold calculated as a difference value taken between said dither threshold and a threshold for line images, said difference value being divided by value representative of said degree detected by said detecting means and then said divided value being added to said threshold for line images.

8. A pseudo halftone generator for converting an input image signal into a pseudo halftone signal constructed of a binary form, comprising:

means for storing dither values defined by differences between dither threshold values and a predetermined fixed threshold level, said dither threshold values being stored in a matrix form;

means for detecting a degree of a level transition of said input image signal and for producing a degree value representative thereof;

means for reading out said dither value stored in said storing means in response to a time sequence to deliver a read-out dither value;

means coupled to receive said degree value and said read-out dither value for determining a threshold value; and means for comparing said input image signal with said threshold value to deliver said pseudo halftone signal.

9. A pseudo halftone generator as claimed in claim 8, wherein said threshold value determining means includes:

means for dividing said read-out dither value by said degree value detected by said detecting means to produce a first value; and means for adding said first value to said predetermined fixed threshold level.

10. A pseudo halftone generator as claimed in claim 8, further comprising means coupled between said detecting means and said determining means for modifying said degree value in accordance with the magnitude of said degree value.

11. A pseudo halftone generator as claimed in claim 10, wherein said modifying means includes a read only memory storing a compensation factor.

12. A pseudo halftone generator as set forth in claim 8 wherein said means for determining a threshold value, on the basis of said degree value, modifies the dither read out value to a first level adapted for the binarization of line images with a large level transition and to a second level approximating the dither value with a small level transition.

13. A pseudo halftone generator as set forth in claim 8 wherein said storing means stores a threshold calculated as a difference value taken between said dither threshold and a threshold for line images, said difference value being divided by said degree value and then said divided value being added to said threshold for line images.

* * * * *